Dec. 24, 1968  E. S. MIHALKO ET AL  3,418,505
DIRECT CURRENT MOTOR HAVING A SELF-SUPPORTING SHELL ROTOR
Filed Sept. 23, 1965  2 Sheets-Sheet 1

INVENTORS.
EMIL S. MIHALKO
DANIEL G. TAYLOR
BY
ATTORNEY.

Dec. 24, 1968　　　　E. S. MIHALKO ETAL　　　　3,418,505
DIRECT CURRENT MOTOR HAVING A SELF-SUPPORTING SHELL ROTOR
Filed Sept. 23, 1965　　　　　　　　　　　　　　2 Sheets-Sheet 2
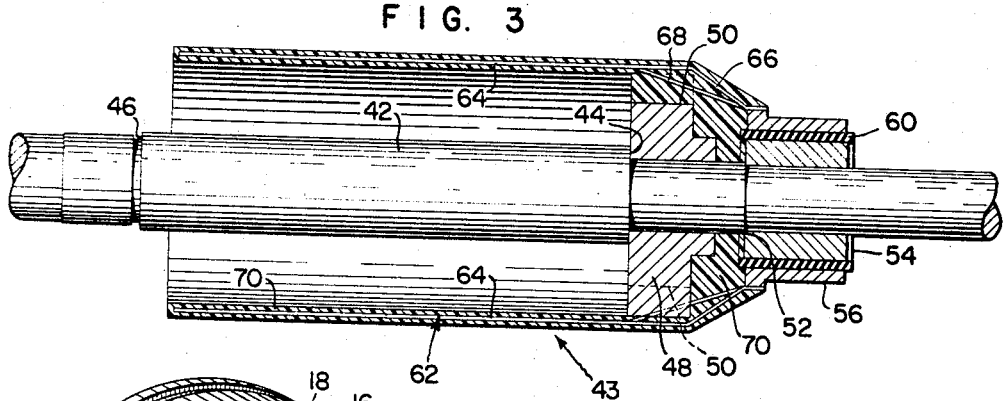
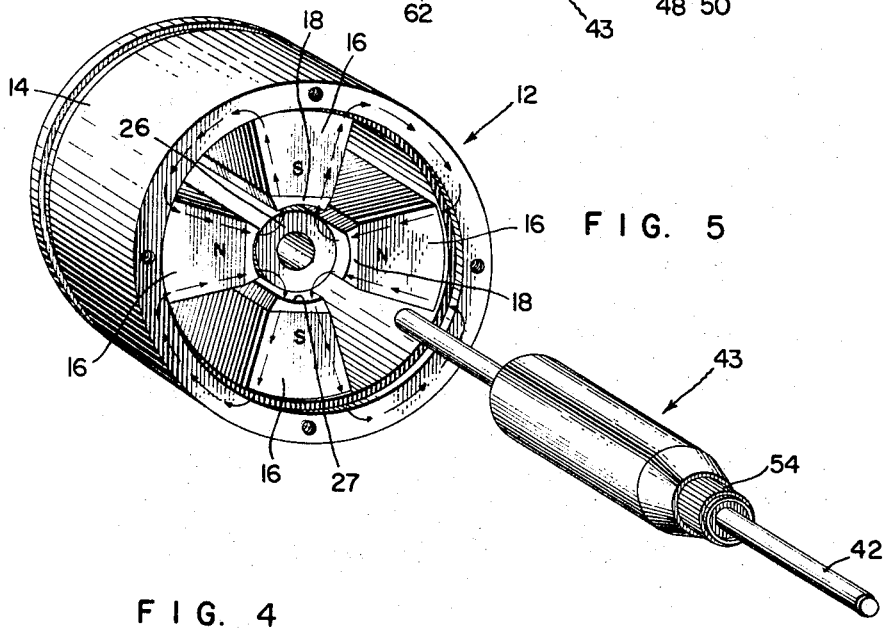
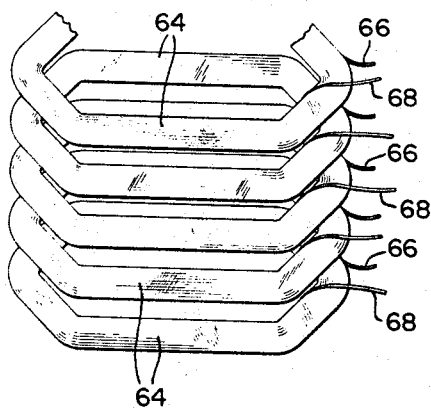
INVENTORS.
EMIL S. MIHALKO
DANIEL G. TAYLOR
BY
ATTORNEY.

United States Patent Office 3,418,505
Patented Dec. 24, 1968

3,418,505
DIRECT CURRENT MOTOR HAVING A SELF-SUPPORTING SHELL ROTOR
Emil S. Mihalko, Harleysville, Pa., and Daniel G. Taylor, Minneapolis, Minn., assignors to Honeywell Inc., Minneapolis, Minn., a corporation of Delaware
Filed Sept. 23, 1965, Ser. No. 489,493
8 Claims. (Cl. 310—266)

ABSTRACT OF THE DISCLOSURE

A direct current motor is shown having a permanent magnet stator and flux return member arranged about a central axis through which a shaft is rotatively mounted. A plurality of individual coils are constructed from a single layer of wire. The coils are laminated into a tubular self-supporting shell with no greater than two thicknesses of coil wire at any point on the perimeter. The shell is then connected to a commutator on the shaft for forming a self-supporting shell rotor between the stator and flux return member.

---

The invention relates to a direct current motor and, more specifically, to an improved shell-type direct current motor.

The shell-type motor configuration, which is utilized by the present invention, derives its unique advantage over other motor configurations through the use of an improved tubular rotor member. Prior art rotors have generally been constructed in the form of a permanently magnetized drag cup or a supporting cup of nonmagnetic material with or without coils attached thereto. When a supporting cup with attaching coils is used, an electromagnetic field established by a permanently magnetized stator and a second coaxial member which creates a flux return path. The permanent magnet may be arranged as the outer or inner member with the flux return member forming the opposite component. In either configuration, the outwardly arranged member is coaxially disposed around its inner counterpart for forming an annular spacing therebetween. Into this annular spacing the shell rotor is introduced and retained in concentric relation therein by suitable end bells. Prior art motors, utilizing the shell-type rotor configuration, have been less efficient than desired due partially to an excessively large annular spacing or air gap between the stator and flux return member and partially due to a build up of thermal energy within the rotor coil.

Accordingly, one object of the present invention is to provide a shell-type direct current motor having high torque and low inertia characteristics.

Another object of the instant invention is to provide a shell-type direct current motor having a tubular shell rotor of reduced cross-sectional thickness for allowing a minimum annular spacing between the stator components.

It is another object of the present invention to provide a novel thin shell rotor.

Still another object of this invention is to provide a thin shell rotor for a shell-type direct current motor wherein the shell rotor will be capable of dissipating thermal enery therefrom.

A further object of the present invention is to provide a shell-type direct current motor which is capable of instantaneous changes of velocity.

A still further object of the present invention is to procide a shell-type direct current motor with a thin tubular shell rotor wherein said rotor construction is free of supporting structural means.

It is a still further object of the instant invention to provide a shell rotor which is free from supporting structure, being supported by its own rotor coils.

Other objects and many of the attendant advantages of the present invention will become better understood when considered in connection with the following detailed specifications and drawings, wherein:

FIG. 3 is a cross-sectional view showing the shell rotor in greater detail;

FIG. 4 is an enlarged detail showing the rotor coils as they are aligned prior to their formation into a rotor; and FIG. 5 is a perspective view showing the basic arrangement of the motor components as well as the magnetic circuit therein.

Figure 1:
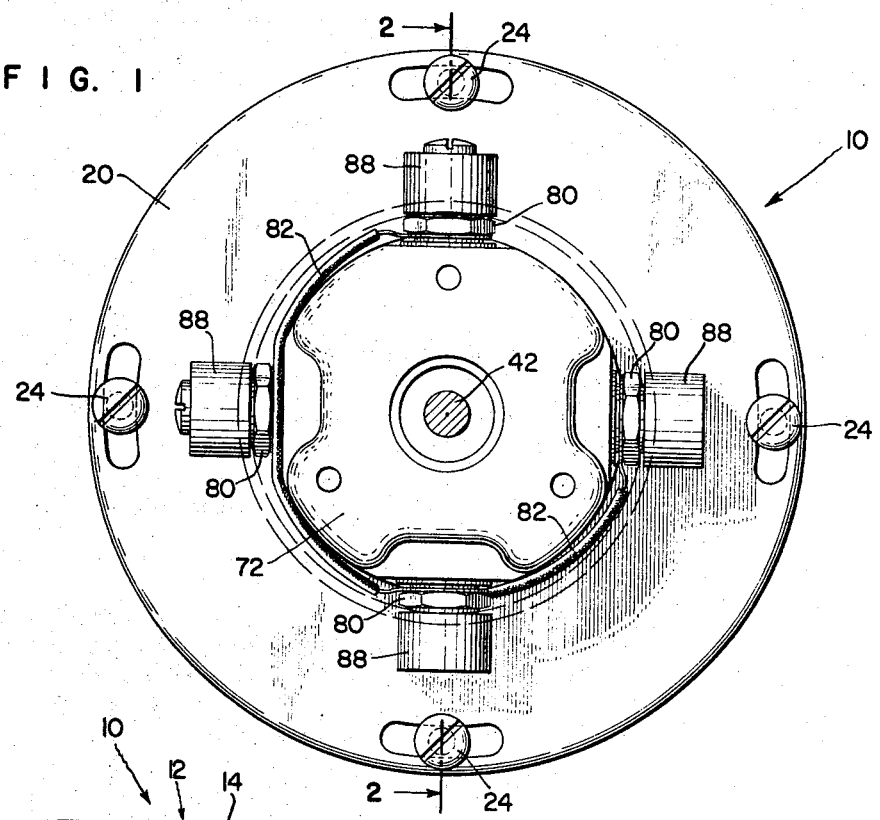
FIG. 1 is an end view of the shell-type direct current motor with the cover shown in phantom.
Figure 2:
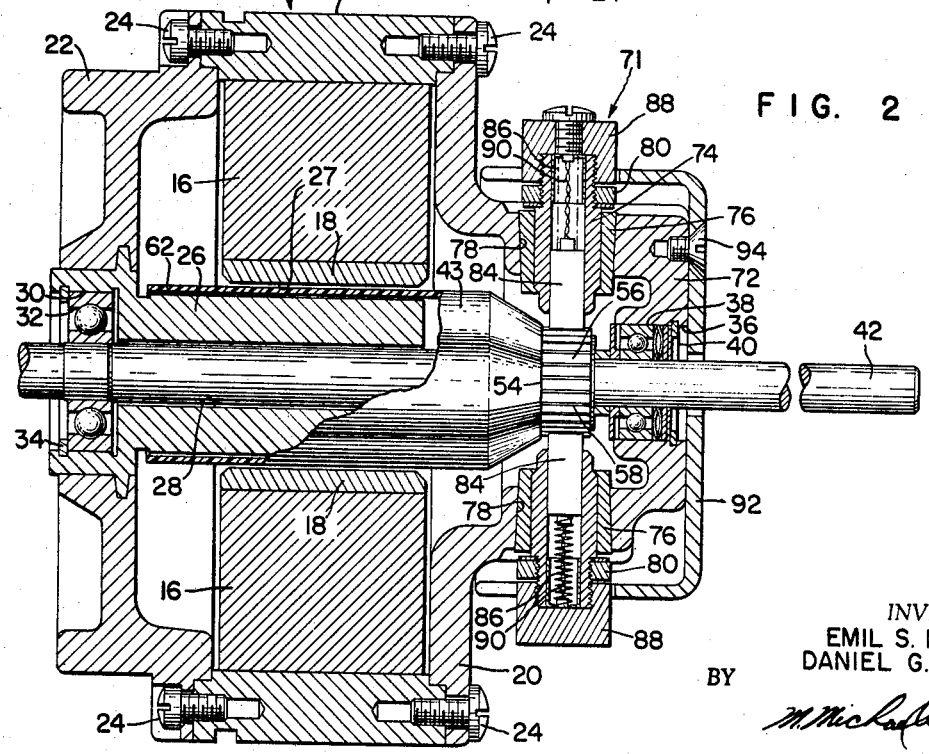
FIG. 2 is a partial cross-section taken along line 2—2 of FIG. 1.

Referring now to the drawings, and specifically to FIGS. 1 and 2, a direct current motor is shown generally at 10. A permanently magnetized stator 12 forms the outer cylindrical portion of the motor 10. Said stator 12 includes a tubular outer housing 14, constructed from a material having a high permeability such as cold rolled steel, and a plurality of equally spaced, inwardly directed pole pieces 16 attached to the inner cylindrical surface of the housing 14. The pole pieces are formed from a permanent magnet material, such as Alnico 5–7, and attached to the inner surface of housing 14 by bonding. A pole facing 18, of cold rolled steel, is bonded to the interior surface of each pole piece 16 thereby completing the permanent magnet stator 12.

A pair of end bells 20 and 22 are secured to each end of the outer housing 12 by a plurality of screws 24. The end bells are constructed from material having a low permeability, such as aluminum, to prevent them from forming a part of the magnetic circuit. The backmost end bell 22 is cast around a cylindrically shaped flux return member 26 which is formed from a high permeability material similar to that of the pole pieces 16. Said flux return member 26 extends inwardly along the central axis of the permanent magnet stator 12 and, once positioned, forms an annular spacing 27 between itself and the stator pole pieces 16. A magnetic circuit is thereby established through each quadrant of the outer housing 14, along one pole piece 16, across the annular spacing 27 into the flux return member 26, and back across the annular spacing into an adjoining pole piece, FIG. 5.

The flux return member 26 is bored at 28, along its central longitudinal axis, and radially relieved at 30 for receiving a bearing 32, secured therein by a retaining ring 34. Similarly, the forward end plate 20 is centrally bored at 36 for receiving a bearing 38 and a retaining ring 40. A shaft 42, supported by the bearings 32 and 38, passes through the central bore 28 and extends beyond the end plates 20 and 22 in a cantilevered engagement.

Referring to FIG. 3, where a shell rotor is shown generally at 43, the shaft 42 is reduced at each end thereby forming shoulders 44 and 46. Shoulder 46 abuts against the inner race of bearing 32 while the shoulder 44 locates a collar 48. The collar 48 is molded from a nonconducting material, such as a polycarbonate resin, and is radially notched 50 about its periphery for simplification of coil assembly, to be described hereinafter. The reduced shaft portion, which forms shoulder 44, is further reduced for the formation of a second shoulder 52. Against said shoulder 52 a commutator 54, having equally spaced copper bars 56 about its periphery, is secured by a press fit with the center of each of its copper bars 56 aligned with the center of each collar notch 50. Each copper bar 56 is insulated from the outer by a mica strip 58 and insulated from the shaft 42 by a mica ring 60. Attached to the commutator 54 is a tubular coil assembly 62 consisting of a plurality of self-supporting copper coils 64, FIG. 3, held in concentric relationship to the shaft 42 by the collar 48. The details of the coil assembly 62 will be described hereinafter. Lead wires 66 and 68 extend in pairs from each coil 64 for forming the means by which the coil assembly 62 is attached to the commutator 54. Each individual coil 64 is positioned on the collar 48 so that the outer lead wire 66 passes over the outer surface of the collar before being attached by spotwelding to its proper commutator copper bar 56. Each inner lead wire 68 passes through an adjacent notch 50 before being attached to the commutator 54. The coil assembly 62, once united with the commutator and shaft as described hereinabove, is encapsulated within an encapsulating material 70 comprised of a combination of polyester resin and a sintered metallic oxide filler. The two constituents are proportionally combined for allowing the encapsulating material to have a coefficient of thermal expansion equalling that of the copper coils. The amount of encapsulating material utilized for covering the coil assembly is limited to a minimum amount necessary for preventing any portion thereof from protruding therethrough. This minimum amount may vary but in the preferred embodiment of this invention the total increase in shell thickness attributed to the encapsulating material does not exceed the thickness of an individual coil wire.

In the preferred embodiment of the present invention the sintered metallic oxide is aluminum oxide, however, other oxides may be used to provide the same basic requirements. The use of the sintered metallic oxide increases the emissivity and the coefficient of conduction of the encapsulating material thereby improving the ability of material to dissipate thermal energy caused by the coil $I^2R$ losses. The addition of a sintered metallic oxide filler in the encapsulating material also increases the structural strength of the material thereby improving the rotor strength. Finally, the abrasive characteristics of a metallic oxide allows the rotor to be self-correcting in regard to any small imperfections caused by rotor and pole piece irregularities or rotor runout, i.e. the initial motor run-in tests tends to grind out such imperfections.

The details of the arrangement of the individual copper coils 64 are shown in FIG. 5 wherein the assembly of these coils into the coil assembly 62 is also shown. Each hexagonally shaped coil 64 is wound in a single layer of wire having, for example, eleven loops per coil. The first loop, or inner loop, is formed with the inner lead wire 68 and the last loop terminates at the outer lead wire 66. The coils are aligned along a common edge with each coil overlapping the other in a laminous manner. The lateral spacing between the inner loop is determined by two factors. First, the hexagonal shape of each coil is arranged for allowing the coils to be laminously stacked one upon the other, whereby no greater than two thicknesses of wire occurs at any point around the periphery of the coil assembly 62. Had the coils 64 been rectangularly shaped, as in some prior art devices, as many as four to five thicknesses of wire could build up at the point where each coil corner overlaps the other, thereby doubling the thickness of the rotor. Secondly, each inner loop of the coil 64 is formed narrower than the projected width of each pole facing 18. Said width being established by projecting the edges of the pole pieces 16 until they intersect with the shell rotor 43. The hexagonal coil arrangement as hereinabove described, reduces the length of inactive copper in the region of the coil end connections, thereby reducing the inertia of the rotor as well as reducing the $I^2R$ losses within the coil assembly. After each coil 64 is hexagonally formed it is subjected to heating above 150° F. by conducting an electric current therethrough. This procedure partially melts a coating compound on the copper wire for initially holding the hexagonal coil shape until the next assembly step. The coating compound serves the dual purpose of bonding agent an insulator, as is well known in the art. The individual coils are next positioned about a cylindrical locating fixture, not shown, by positioning rings, for alignment and proper orientation as indicated in FIG. 5. The coils are then spirally laced with a silk thread which is attached thereto by activating the coil bonding agent with a suitable solvent. The positioning rings are removed and the entire coil assembly 62 is then bonded into a self-supporting structure by activating the bonding agent with the solvent and clamping said assembly until dry. This self-supporting coil assembly 62 is then united with the commutator 54 and the shaft 42, as described hereinabove, and encapsulated within the polyester resin and sintered metallic oxide compound for completing the shell rotor 43.

The rotor coils 64 are energized through the commutator 48 and four brush assemblies shown generally at 71. The forward end bell 20 is formed with a hub section 72 for mounting the brush assemblies 71. Each brush assembly includes a tubular brass brush holder 74 having a non-conducting plastic band 76 molded about its outer diameter. The brush holders 74 are mounted in ports 78 in the side of hub section 72, as by bonding. The outer surface of each brush holder 74 extends beyond the hub section 72 and is threaded to receive a nut 80 for securing and connecting wires 82 between opposite brush holders. A metallic graphite brush 84 inserts into the brush holder 74 and is maintained in continuous contact with the commutator 48 by the urging of a spring 86 which, in turn, is retained within the tubular brush holder 74 by an internally threaded brass cap 88. Shunt wires 90 electrically connect each brush 84 to its retaining cap 88. A cover 92, molded from a polycarbonate resin, fits over the end bell hub section 72 and is secured thereto by a screw 94. The cover 92 protects the connecting wires 82 and completes the shell-type direct current motor assembly.

The unique two wire thickness of the self-supporting coil assembly 62 and the minimization of the encapsulating material 70 surrounding the coil assembly 62 to less than the thickness of one coil wire creates a rotor shell having an optimal thickness. By allowing less than a thickness of a single coil wire as clearance between the shell rotor 43 and its adjoining flux return member 26 and stator pole pieces 16, the thickness of said annular spacing 27 may be kept to a nominal dimension of less than four thicknesses of coil wire.

Through the unique arrangement of the coils 64 within the coil asembly 62, allowing for a reduction of wire within each coil 64 and a reduction of coils within the coil assembly 62, the amount of thermal energy produced by the $I^2R$ losses within the shell rotor 43 is greatly reduced. The utilization of the polyester resin having a sintered metallic oxide therein for encapsulating the coil assembly 62 increases the ability of that assembly to dissipate thermal energy. Therefore, the combination of decreased $I^2R$ losses within the shell rotor 43 and the increased ability of the rotor to dissipate thermal energy therefrom provides for a substantial improvement of rotor efficiency. The unique coil assembly 64, which allows for the thin shell rotor configuration, makes it possible to reduce the thickness of the annular spacing 27 to a minimum. This reduced spacing, in turn, creates an increased flux density between the pole pieces 16 and the flux return member 26 thereby providing for a second increase in motor efficiency. The increased flux density within the annular spacing 27 also increases the amount of torque which the direct current motor is capable of delivering.

The reduction of wire within each coil 64, reduction of the total coils comprising the coil assembly 62, and reduction of shell rotor 43 thickness all unite to decrease the rotor inertia. Because of the decreased rotor inertia and the increased flux density, the direct current motor has the ability to change its velocity instantaneously.

The embodiment of the present invention discloses a direct current motor having a self-supporting, thin shell rotor therein for improving the torque, efficiency, and reducing the inertia thereof. Obviously many modifications and variations of the present invention may be made in light of the above teachings and the invention as described hereinabove should be considered as an illustration rather than a limitation and, consequently, the invention should be limited only by the appended claims.

What is claimed is:

1. A direct current motor having high torque and low inertia characteristics, comprising:
   a multi-pole permanent magnet stator symmetrically arranged about a central axis,
   a flux return member concentric with said central axis and coaxially arranged with said stator for forming annular spacing, and
   shaft means rotatively arranged through said central axis,
   commutator means attached to said shaft means,
   a plurality of individual, generally hexagonal coils each constructed from a single layer of wire laminated one over the other into a tubular, self-supporting shell such that no greater than two thickness of coil wire occur at any point on the perimeter of said shell,
   said self-supporting shell attached to said commutator means for forming a shell rotor concentrically disposed in equally spaced relationship within said anular spacing, and
   means for applying a direct current through said shell rotor coils.

2. A direct current motor having high torque and low inertia characteristics, comprising:
   a multi-pole permanent magnet stator having pole pieces radiating inwardly toward a central axis,
   a cylindrical flux return member coaxially arranged about said central axis within said permanent magnet stator,
   shaft means rotatively disposed through said central axis,
   commutator means attached to said shaft means,
   a plurality of individual, generally hexagonal coils each constructed from a single layer of wire laminated over one another into a tubular, self-supporting shell such that no greater than two thicknesses of coil wire occur at any point on the perimeter of said shell,
   said self-supporting shell attached to said commutator means for forming a shell rotor concentrically disposed in equally spaced relationship between said stator and said flux return member,
   coating means encapsulated about said self-supporting shell for increasing the dissipation of thermal energy therefrom, and
   means for applying a direct current through said shell rotor coils.

3. A direct current motor having high torque and low inertia characteristics as claimed in claim 2 wherein said coating means encapsulated about said self-supporting shell includes an excapsulating material and a sintered metallic oxide filler therein for improving the dissipation of thermal energy therefrom and increasing the structural strength thereof.

4. A direct current motor as described in claim 2, wherein each of said coils consists of copper wire, and said coating means includes an encapsulating material consisting of a polyester resin and the proper proportions of sintered metallic oxide whereby the coefficient of thermal expansion of the resultant encapsulating material equals that of the copper wire.

5. A direct current motor having high torque and low inertia characteristics, comprising:
   a multi-pole permanent magnet stator having pole pieces radiating inwardly toward a central axis,
   a cylindrical flux return member coaxially arranged about said central axis within said permanent magnet stator,
   shaft means rotatively disposed through said central axis,
   commutator means attached to said shaft means,
   a plurality of individual, generally hexagonal coils each constructed from a single layer of wire,
   said coils laminated one over the other into a tubular, self-supporting shell such that no greater than two thicknesses of coil wire occur at any given point on the perimeter of said shell,
   said self-supporting shell attached to said commutator means for forming a shell rotor concentrically disposed between said stator and said flux return member,
   said coils being so disposed about said shell rotor perimeter that for a given rotor position only one coil shall align itself symmetrically in juxtaposition with any one of said stator pole pieces and said coils being formed for allowing their inner loop to be enclosed within the projected face area of said pole piece when symmetrical thereto,
   means including encapsulating material coated about said self-supporting shell for increasing the dissipation of thermal energy therefrom, and
   means for applying a direct current through said shell rotor coils.

6. A direct current motor as set forth in claim 5, wherein said encapsulating material consisting of a polyester resin having a sintered metallic oxide filler therein for improving the dissipation of thermal energy and increasing the structural strength thereof.

7. A direct current motor, as set forth in claim 6, wherein each of said coils consists of copper wire, and said polyester resin and sintered metallic oxide includes the proper proportions of each consituent for forming an encapsulating material having the same coefficient of thermal expansion as said copper coils.

8. A self-supporting shell rotor having a shaft and commutator fixed to said shaft for utilization within an electromagnetic field comprising:
   a plurality of hexagonal coils having a thickness of a single wire,
   said hexagonal coils laminated one over the other into a tubular self-supporting shell such that no greater than two coils overlap at any point on the shell perimeter for limiting the maximum shell thickness to two thicknesses of said coil wire,
   said self-supporting shell attached to said commutator for forming a thin self-supporting shell rotor, and
   coating means encaspulated about said self-supporting shell rotor.

References Cited

UNITED STATES PATENTS

| | | | |
|---|---|---|---|
| 3,335,309 | 8/1967 | Hansen | 310—266 |
| 3,121,851 | 2/1964 | Packard | 310—266 X |
| 3,076,111 | 1/1963 | Burgwin | 310—266 |
| 1,796,556 | 3/1931 | Boitel | 310—266 X |

J D MILLER, *Primary Examiner.*

R. SKUDY, *Assistant Examiner.*

U.S. Cl. X.R.

310—24, 261